United States Patent Office 3,414,527
Patented Dec. 3, 1968

3,414,527
DIHYDROPYRANYL ESTER BLENDS
Josef Sikora, St. Hilaire, Quebec, Canada, assignor to Canadian Industries Limited, Montreal, Quebec, Canada, a corporation of Canada
No Drawing. Filed May 31, 1966, Ser. No. 553,642
Claims priority, application Great Britain, July 6, 1965, 28,575/65
20 Claims. (Cl. 260—2.5)

ABSTRACT OF THE DISCLOSURE

Novel foamed cellular polymeric materials from blends of dihydropyranyl group containing esters useful for upholstery mattresses, etc.

---

This invention relates to novel foamable compositions and, more particularly, to novel foamable compositions based on vinyl ethers and to the foamed cellular polymeric materials obtained therefrom.

In British Patent No. 991,970 to W. D. S. Bowering, N. B. Graham and J. D. Murdock, there are described foamable compositions of a novel type comprising at least one polymerizable vinyl ether containing at least two vinyl groups per molecule, a foaming agent, an acidic catalyst and, optionally, at least one compound reactive with said vinyl ether such as a phenol, an alcohol, an epoxidized material, a polycarboxylic acid, a polyamide, a polycarbamate or a monoethylenically unsaturated compound. These compositions yield foamed cellular polymeric materials which are superior to the known polyurethanes from the standpoint of ingredient toxicity and are superior to the known polystyrene foams as to foaming-in-place convenience. However, some of said vinyl ether foams have deficiencies in physical properties. For example, the foams containing aliphatic ester or acetal groups disclosed in the above application often do not possess adequate hydrolytic stability for use in moist environments such as found, for example, in construction applications.

It has now been found that cyclic vinyl ethers having rings linked by single ester group linkages can be modified by an ester exchange process to form foam products having desirable commmercial properties. In said process a cyclic vinyl ether having terminal vinyl ether rings linked by single ester group linkages is subjected to ester exchange reactions with an aliphatic polyhydric alcohol and an alkyl ester of an aromatic polycarboxylic acid to produce a blend of esters constituted by the residues of the polyhydric alcohol and polycarboxylic acid ester each terminated through ester linkages with cyclic vinyl ether groups. The said blend of cyclic vinyl ether-terminated esters, when employed in foamable compositions containing additionally a foaming agent and a catalyst, produce foamed cellular polymeric materials of improved properties.

It is therefore an object of this invention to provide a novel process for the preparation of foamed cellular polymeric materials from polymerizable vinyl ethers. Another object is to provide novel foamed cellular polymeric materials from blends of dihydropyranyl group-containing esters. Additional objects will appear hereinafter.

The novel foamed cellular polymeric compositions of this invention are the reaction products of compositions comprising a blend of esters having the generic formulas

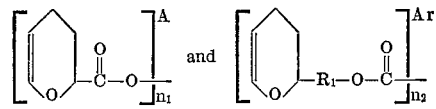

where $n_1$ and $n_2$ are integers, at least one of which has a value of at least 2, $R_1$ is a divalent lower aliphatic radical, A is a linking aliphatic radical having a valence equal to $n_1$, and Ar is a linking aromatic radical having a valence equal to $n_2$, a foaming agent and a catalyst.

The ester blend ingredients of the foamable compositions are conveniently prepared from dihydropyranyl group-containing compounds wherein two terminal dihydropyranyl rings are linked by a single ester linkage. Such compounds are readily prepared by the condensation of a dihydropyranyl carboxaldehyde as disclosed in United States Patent No. 2,537,921 to Curtis W. Smith. A compound of this type is 3,4-dihydro-2H-pyran-2-methyl-(3,4-dihydro-2H-pyran-2-carboxylate).

In the preferred process for preparing the above ester blends a dihydropyranyl group-containing compound having terminal dihydropyranyl rings linked by single ester linkages is reacted in successive steps with an aliphatic polyhydric alcohol and a lower alkyl ester of an aromatic carboxylic acid as follows:

Step 1

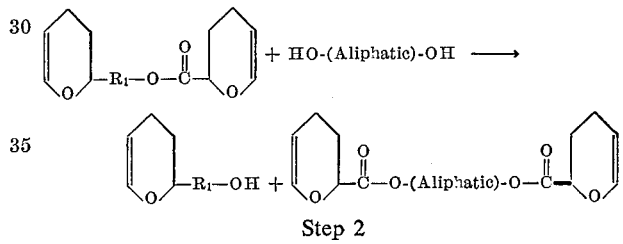

Step 2

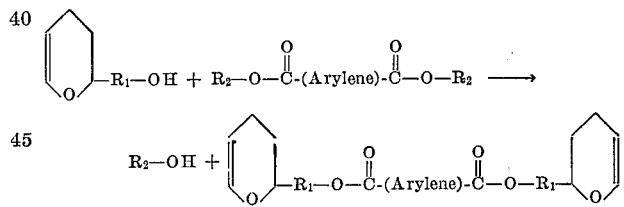

$R_1$ being a lower aliphatic radical, $R_2$ being a lower alkyl radical, Aliphatic being an aliphatic radical and Arylene being an aromatic radical.

The dihydropyranyl alcohol product of the ester exchange reaction of Step 1 is separated from the reaction mixture and reacted in Step 2 with a lower alkyl ester of an aromatic polycarboxylic acid. The lower alkyl monohydric alcohol product of the ester-exchange reaction of Step 2 is separated from the reaction mixture. The difunctional ester products of Step 1 and Step 2 are then combined to form the ester blend.

In a preferred embodiment of the blend preparation, 3,4 - dihydro - 2H - pyran - 2 - methyl - (3,4 - dihydro 2H-pyran-2-carboxylate) is reacted in Step 1 with 1,2,6-hexanetriol or a mixture of glycerol and 1,2,6-hexanetriol. In Step 2, dihydropyranyl methanol is reacted with dimethyl phthalate.

An alternative, but less preferred process for preparing the ester blends comprises reacting a dihydropyranyl group-containing compound having terminal dihydropyranyl rings linked by single ester linkages in a first step with a lower alkyl ester of an aromatic carboxylic acid and in a second step with an aliphatic polyhydric alcohol as follows:

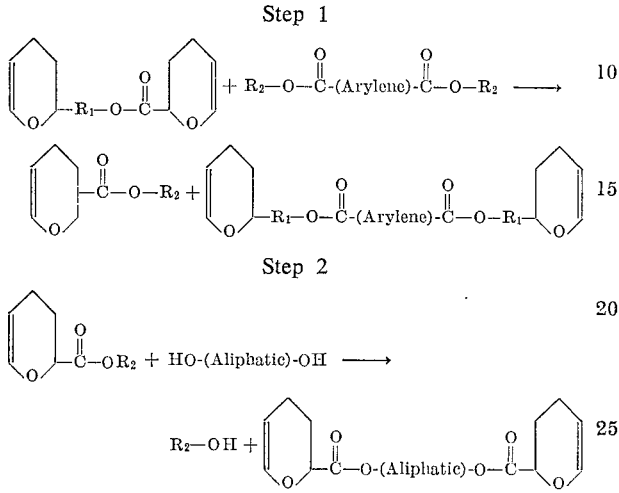

the symbols having the same significance as above.

The dihydropyranyl carboxylic acid ester product of the ester exchange reaction of Step 1 is separated from the reaction mixture and reacted in Step 2 with an aliphatic polyhydric alcohol. The lower alkyl monohydric alcohol product of the ester exchange reaction of Step 2 is separated from the reaction mixture. The difunctional ester products of Step 1 and Step 2 are then combined to form the ester blend.

Alternatively, it is possible to combine the two aforesaid steps by reacting a compound having terminal dihydropyranyl rings linked by single ester linkages with both an aliphatic polyhydric alcohol and a lower alkyl ester of an aromatic polycarboxylic acid so that the two ester exchange reactions take place concurrently. The lower alkyl monohydric alcohol reaction product is separated as in the two step process. The ester blend obtained will contain polyester products owing to concurrent reactions.

In the ester exchange processes it is convenient to employ distillation to separate the reaction products. Although the reactions may be taken to completion it has been found that reaction products resulting from as low as 60% conversion are useful in foamable compositions. It is desirable, however, to remove the monohydric alcohol from the product.

The aliphatic polyhydric alcohol and aromatic polycarboxylic acid lower alkyl ester ingredients employed in the preparation of the ester blends may be either monomers or low molecular weight polymers. Suitable polymeric ingredients include low molecular weight polyesters terminated by aliphatic hydroxyl groups or aromatic carboxylic ester groups.

In order to carry out the ester exchange reactions employed in the preparation of the ester blends, it is necessary to employ ester exchange catalysts such as sodium methoxide or magnesium dihydropyranyl methoxide.

It has been found that the sodium alkoxides of aliphatic polyhydric alcohols such as 1,2,6-hexanetriol are particularly advantageous as catalysts for the ester exchange reaction between an aliphatic polyhydric alcohol and a compound having terminal dihydropyranyl rings linked by single ester linkages in that, owing to the absence of univalent alkyl radicals, the undesirable monofunctional alkyl ester of dihydropyranyl carboxylic acid is not formed as a by-product. Said alkoxides can be prepared by dissolving sodium metal in an aliphatic polyhydric alcohol or by reaction between sodium methoxide and an aliphatic polyhydric alcohol.

In the preparation of the ester blends it is convenient to employ the dihydropyranyl group-containing compound, the aliphatic polyhydric alcohol and aromatic polycarboxylic acid ester ingredients in substantially stoichiometrically equivalent proportions. In this manner the ester blend contains all the fragments of the source materials with the exception of the alkyl monohydric alcohol by-products.

Dihydropyranyl compounds suitable for the process include all polymerizable dihydropyranyl compounds containing at least two dihydropyranyl groups per molecule wherein said dihydropyranyl groups are linked by ester linkages. Suitable examples are 3,4-dihydro-2H-pyran-2-methyl-(3,4-dihydro-2H-pyran-2-carboxylate) of the formula

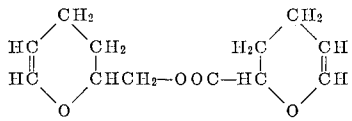

3,4 - dihydro - 5 - methyl - 2H - pyran - 2 - methyl - (3,4-dihydro-2H-pyran-2-carboxylate) of the formula

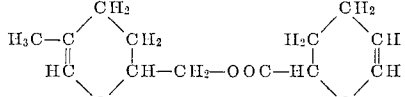

and 3,4-dihydro-5-methyl-2H-pyran-2; 2-dimethyl - (3,4-dihydro-2H-pyran-2-carboxylate) of the formula

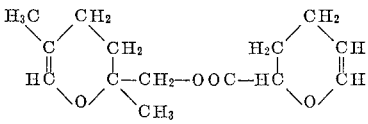

The aliphatic polyhydric alcohols suitable for use in the process include polypropylene glycols, ethylene glycol, castor oil, sugar alcohols, polyether condensates of polyhydric alcohols and olefin oxides such as the polypropylene oxide condensates of hexahydroxy sugar alcohols and propylene oxide, 1,5-pentane diol, glycerol, 1,2,6-hexanetriol, and hydroxy-containing esters and polyesters obtained by condensation of polyhydric alcohols and poly basic acids.

Suitable esters of aromatic polycarboxylic acid include lower alkyl esters of phthalic, isophthalic, terephthalic, trimetallitic and trimesic acids.

Foaming agents suitable for use in the foamable compositions are those which are soluble or dispersible in the blended vinyl ether-containing esters and are sufficiently volatile that they vaporize during the formation of the foamed polymeric material. The heat of the catalyzed polymerization reaction causes the foaming agent to boil, and the vapour forms bubbles which expand during the polymerization reaction to give a low density, foamed polymerized mass. Preferred foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, trichloroethylene, and perchloroethylene. Suitable amounts of foaming agent range from 2% to 30% by weight of the foamable composition.

Catalysts suitable for promoting the polymerization reaction of the polymer-forming ingredients of the foamable compositions may be either acidic or non-acidic and include all catalysts capable of accelerating the reactions of vinyl ethers with compounds containing active hydrogen atoms.

The acid catalysts suitable for promoting the polymerization reaction include the strong proton-donating acids, such as p-toluene-sulfonic acid, and the Lewis acids such as boron trifluoride conveniently employed as the etherate. Other materials which are suitable as catalytic ingredients are trimethoxyboroxine, ferric chloride, stannic chloride, phosphorus pentachloride, phosphoric acid, perchloric acid, acetic acid, trifluoroacetic acid, trichloroacetic acid, fluoboric acid, boron trifluoride dihydrate, hydrogen fluoride, antimony pentafluoride, hexafluorophosphoric acid, lead fluoborate, antimony fluoroborate, sulphuric acid and silicotungstic acid.

Examples of suitable non-acidic catalysts include iodine and iodine-containing compounds such as iodine chloride, iodine bromide, iodine perchlorate, iodine acetate, iodine triphosphate and iodine triacetate; triphenyl methyl derivatives of anions having a low ester forming tendency, for example, triphenylmethyl perchlorate, hexachloroantimonate, chloromercurate, chlorozincate and chloroaluminate; alkyl, acyl and aroyl perchlorates and hexachloroantimonates such as tert-butyl acetyl and benzoyl compounds; and diazonium salts such as diazonium chlorides, fluoborates and hexachloroantimonates.

It is possible to control the polymerization reaction by employing catalyst combinations, e.g., p-toluenesulfonic acid and boron trifluoride or boron trifluoride and trimethoxy boroxine. The solvent in which the catalyst is dissolved also affects the catalyst reactivity, polypropylene glycol solutions of boron trifluoride etherate being less reactive than xylene solutions of said catalyst. Suitable catalytic amounts range from 0.005% to 2.0% by weight of the process ingredients, but these amounts are not limitative since the amount of the catalyst should be adjusted to the temperature of operation and the foam induction period required.

The foamable compositions may also include materials which are non-reactive such as flame retardants, surfactants, dyes, fillers, stabilizers, antioxidants, extenders, plasticizers and viscosity modifiers such as the polyvinyl chloride, vinyl acetate/vinyl chloride copolymers and rubbers.

Suitable flame retardants include tris($\beta$-chloroethyl) phosphate, 2:2 - bis - (3',5'-dibromo-4-'-hydroxyphenyl) propane, tris(2,3-dibromopropyl) phosphate, chlorendic acid and polyvinyl chloride, with or without antimony oxide.

Preferred surfactants are those of the silicone type, examples of which are disclosed in Belgian Patents Nos. 582,362 and 584,089, i.e. being of siloxane oxyalkylene copolymer type.

By the term "hydrolytic stability" is meant the property of a foam that causes it to withstand prolonged contact with water. This property can be tested by the rigorous procedure of boiling a cube of foamed material in water. Instability of the foam is shown by the formation of a cavity, by dissolution or by weight loss. Flexible foams, owing to their normally open cell structure, are more permeable to water and their performance in the aforesaid boiling water test will therefore not be comparable to that of rigid foams having a closed cell structure. Many of the foams disclosed in British Patent No. 991,970 break down in less than a day when subjected to this test.

The blend of esters may be used for the production of foams without prior removal of the esterification catalyst residues, purification not being necessary for the production of satisfactory foamed cellular polymeric materials.

For the formation of a foam, the ingredients may simply be mixed by stirring in a vessel and then quickly poured into a mould. They may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam dispensing machines, the ingredients are mixed under pressure using a foaming agent which is gaseous at the mixing temperature, the pressure being controllably released, and the frothed mixture is then dispersed to the point of use. In such a frothing machine, a surfactant is not essential. However, in ordinary dispensing machines, wherein the foaming compositions are dispensed before foaming starts, the use of a surfactant is often desirable. In many recipes, it has been found that reduction of the amount of surfactant to the point where the bubbles just burst as polymerization is complete gives foams of the well known "open cell" structure.

The foams in a flexible form may be used for upholstery, mattresses, etc. In rigid form, they are eminently suited for heat and sound insulating purposes either in closed cavities or in enveloping blankets.

The invention has the commercial advantage that a readily available source material, 3,4-dihydro-2H-pyran-2-methyl-(3,4-dihydro-2H-pyran - 2 - carboxylate) can be employed for the preparation of the ester blends.

The invention has the additional advantage that the blended product contains all the fragments of the dihydropyranyl source material, the only product of the process not used in foam production being an alkyl alcohol. As a result, the invention makes efficient use of the ingredients without producing by-products for which no commercial utility exists. Owing to the presence of the aliphatic polyhydric alcohol and aromatic polycarboxylic acid components in the molecule, the ester blends of the compositions of this invention contain fewer double bonds per unit of weight than the dihydropyranyl source material and so are less reactive than the latter. The ester blends can thus be designed to have such reactivity that they may be used without mixture with other reactive ingredients in foamable compositions. This simplifies formulation and control of foaming procedure.

The foams of this invention are hydrolytically stable thereby being suitable for use in moist environments.

It has also been found that the foams of this invention produce less heat during foaming with the result that darkened or "scorched" foams are less likely to be obtained than with foamable compositions containing a higher proportion of dihydropyranyl double bonds.

It is possible to vary the molecular weight of the ester blends by choice of suitable polyhydric alcohol and aromatic carboxylic acid ester components. In this way it is feasible to obtain foaming compositions suited to specific applications in physical properties such as viscosity. Likewise this permits inserting inexpensive components into the ester molecules.

It has been found that foams prepared from the ester blends have strong, glossy skins.

The invention will be more fully illustrated by the following examples, but it is to be understood that its scope is not to be limited to the specific embodiments shown.

EXAMPLE 1

8750 grams of crude 3,4-dihydro-2H-pyran-2-methyl-(3,4-dihydro-2H-pyran-2-carboxylate) and 1450 grams of 1,2,6-hexanetriol were placed in a 12-liter, three-necked flask adapted for distillation and provided with means for maintaining constant temperature and pressure. The low boiling components of the crude 3,4-dihydro-2H-pyran-2-methyl-(3,4-dihydro-2H-pyran-2-carboxylate) were removed by distillation at 3 mm. mercury pressure until the flask temperature reached 130° C. The distillate weighed 394 grams leaving 8356 grams of 3,4-dihydro-2H-pyran-2-methyl-(3,4-dihydro - 2H - pyran-2-carboxylate) in the flask.

Next day the flask was heated to 90°–95° C. and a lump of sodium metal weighing 4.1 grams was added to the flask contents. Pressure in the flask was reduced to between 8 and 2 mm. mercury and the temperature of the flask was maintained between 118° and 130° C. The molten sodium floated on the surface of the reaction mixture and appeared to be reacting very slowly. Sodium methoxide (25% solution in methanol) was then added to the reaction mixture from a hypodermic syringe introduced through a rubber serum cap fitted to a side arm of the reaction flask, the rate of addition being such that material boiling at about 70° C. distilled from the reaction mixture at about 3 cc. per minute. After three days, 2676 grams of this distillate ($D_1$) were collected. The temperature of the reaction mixture was then increased giving an intermediate fraction ($D_2$) of 194 grams weight boiling at about 50° C. and 2 mm. mercury pressure and a final fraction ($D_3$) of 333.5 grams weight boiling at 130°–140° C. at about 5 mm. mercury pressure. The final fraction was collected at a rate of 77 cc. per minute. During the reaction, a total of 165 cc. of the sodium methoxide solution were employed. The reaction mixture remaining in the flask was then cooled to room temperature, being a liquid having a viscosity of 35 poises and weighing 6337 grams. The compositions of the several products were determined by gas liquid chromatography and are shown in Table I.

It can be seen from Table I that distillates $D_1$ and $D_2$ contained, in addition to dihydropyran-2-methanol, about 9% of the methyl ester of dihydropyran-2-carboxylic acid. The residue in the flask which was mainly the 1,2,6-hexanetriol ester of dihydropyran-2-carboxylic acid, contained also 20% of unreacted 3,4-dihydro-2H-pyran-2-methyl-(3,4-dihydro-2H-pyran-2-carboxylate).

rial which passed over into the receiver in this manner was returned to the reaction flask. Toward the end of the reaction the flask temperature was raised to 170° C. while the pressure was gradually reduced to 6 mm. mercury. During this period 80 cc. of distillate came over which contained 68% by volume of dihydropyran-2-methanol, 9% by volume of methyl dihydropyran-2-carboxylate, 1% by volume of 3,4-dihydro-2H-pyran-2-carboxaldehyde and 5% by volume of dimethyl phthalate. The residue in the flask weighed 654 grams and was a dark mobile liquid.

EXAMPLE 3

388 grams of dimethyl phthalate (containing 0.18% by weight of water) and 456 grams dihydropyran-2-methanol, containing 0.06% water, 3.8% 3,4-dihydro-2H-pyran-2-carboxaldehyde but no methyl dihydropyran-2-carboxylate and which boiled at 74° C. at 10 mm. mercury pressure were placed in a 1-liter four-necked flask fitted with a mechanical agitator, a temperature regulator, a neck sealed with a serum bottle cap, an 8-inch Vigreux column leading via a condenser to a receiver and two Dry Ice traps in series and a monostat connected to a vacuum line. The temperature of the reaction mixture was adjusted to 110° C. and while the reaction mixture was vigorously agitated sodium methoxide (10 cc. of 4.35 N solution in

TABLE I

| Material | Weight of material, grams | 3,4-dihydro-2H-pyran-2-carboxaldehyde | | 3,4-dihydro-2H-pyran-2-methanol | | Methyl 3,4-dihydro-2H-pyran-2-carboxylate | | 3,4-dihydro-2H-pyran-2-methyl-(3,4-dihydro-2H-pyran-2-carboxylate) | |
|---|---|---|---|---|---|---|---|---|---|
| | | Grams | Moles | Grams | Moles | Grams | Moles | Grams | Moles |
| $D_1$ | 2,676 | 123 | 1.10 | 2,300 | 20.2 | 246 | 1.73 | | |
| $D_2$ | 194 | 3.1 | 0.03 | 136 | 1.2 | 17 | 0.12 | 38 | 0.2 |
| $D_3$ | 333.5 | 4.9 | 0.04 | 164 | 1.4 | 7 | 0.05 | 156 | 0.7 |
| Residue in flask | 6,337 | | | | | | | 1,260 | 5.6 |
| Total | 9,340.5 | 131 | 1.17 | 2,600 | 22.8 | 270 | 1.90 | 1,454 | 6.5 |

Although the material balance of the reaction can account for 97.4% of the mass employed, 20.7% of the 3,4-dihydro - 2H - pyran - 2-methyl-(3,4-dihydro-2H-pyran-2-carboxylate) employed in the reaction had not been accounted for by the analysis of the materials listed in Table I and had probably polymerized to higher boiling products. However, the reaction product was found useful for the preparation of cellular polymeric material without further purification.

EXAMPLE 2

388 grams of dimethyl phthalate and 456 grams of blended distillate of the type described in Example 1 found by gas-liquid chromatography to contain 89% by volume of 3,4-dihydro-2H-pyran-2-methanol, 4% by volume of methyl 3,4-dihydro-2H-pyran-2-carboxylate, the remainder being low boiling ingredients including 3,4-dihydro-2H-pyran-2-carboxaldehyde were placed in a 1-liter flask adapted for distillation under vacuum and fitted with a temperature regulator and a side arm sealed with a serum cap. The mixture was heated to 120° C. under partial vacuum so that although methanol distilled off dihydropyran-2-methanol remained in the flask. 6.7 cc. of a 4.0 N solution of sodium methoxide in methanol were added at intervals. The pressure was not controlled precisely during the preparation and occasionally dihydropyran methanol surged over into the receiver. Twice matemethanol) was added in 1 cc. portions over a period of 30 minutes. During the addition of the sodium methoxide the pressure was reduced from an initial value of 100 mm. mercury to a final pressure of 4 mm. mercury at such a rate that dihydropyran-2-methanol distilled slowly into the receiver to a total amount of 62.8 grams. The contents of the cold trap weighed 128.3 grams. The product remaining in the reaction flask weighed 655.3 grams, 99.2% of the mass being accounted for in the material balance. The trap contents contained 15.3% of dihydropyran-2-methanol. Assuming the remainder of the trap contents to be methanol and allowing for the methanol used with the sodium methoxide the conversion based on recovered methanol was 82.3%. The distillate contained 95% dihydropyran-2-methanol and conversion based on dihydropyran-2-methanol balance was 78.5%. The product contained 2.3% by volume of unreacted di-methyl phthalate as determined by gas liquid chromatography. From this result and making use of the material balance and analyses reported above it can be deduced that the reaction product contained 75.2% of bis(dihydropyranyl) phthalate and 22.3% of methyl dihydropyranyl phthalate.

The product shortly after preparation was a mobile liquid having a viscosity of 16 poises. After one week the product became solid but liquified on vigorous shaking of the container.

EXAMPLE 4

Magnesium dihydropyranyl methoxide was prepared in the following manner. 150 cc. of dihydropyran-2-methanol were placed in a flask fitted for vacuum distillation and approximately 420 cc. of 1 N solution of magnesium methoxide in methanol were added. Methanol was distilled off until the residue weighed 153 grams. The residue contained 3.10 milli-equivalents of alkali per cc.

Into a 3 liter flask of the type described in Example 1 were placed 1 liter of 3,4-dihydro-2H-pyran-2-methyl-(3,4-dihydro-2H-pyran-2-carboxylate) and 862 cc. of polypropylene glycol of molecular weight 425. The reaction mixture was heated to between 128° and 142° C. under 2 mm. mercury pressure and the above described magnesium dihydropyranyl methoxide solution was added in 5 cc. portions. The addition of the first 10 cc. of the magnesium dihydropyranyl methoxide solution resulted in reaction giving a distillate of 50 cc. distilling between 37° and 50° C. The reaction mixture was maintained at 128° C. for an hour and a further 15 cc. of magnesium dihydropyranyl methoxide solution were added. The total amount of distillate was 528 cc. The residue in the reaction flask was a black liquid weighing 1456 grams.

EXAMPLE 5

Employing the apparatus of Example 4, 1 liter of crude 3,4 - dihydro - 2H-pyran-2-methyl-(3,4-dihydro-2H-pyran-2-carboxylate) and 862 cc. of polypropylene glycol of molecular weight 425 were heated to 130° C. under a pressure of 2 mm. mercury. No distillate was produced. 20 cc. of the mangesium dihydropyranyl methoxide solution described in Example 4 were added but no distillate was produced. A further addition of magnesium dihydropyranyl methoxide solution resulted in 150 cc. of distillate boiling between 58° and 62° C. The flask temperature was gradually increased to 180° C. while magnesium dihydropyranyl methoxide solution was added in 5 cc. portions to a total of 40 cc. The total amount of distillate produced was 455 cc. The residue in the reaction flask was a dark brown liquid which became light on prolonged storage and deposited a dark sludge. Gas liquid chromatography of the residue did not detect the presence of 3,4-dihydro-2H-pyran-2-methyl-(3,4 - dihydro - 2H-pyran-2-carboxylate) therein.

EXAMPLE 6

2153 cc. of 3,4-dihydro-2H-pyran-2-methyl-(3,4-dihydro-2H-pyran-2-carboxylate) and 250 cc. of glycerol were placed in a flask of the type described in Example 1. At a pressure of between 7 mm. and 14 mm. mercury at 146° C. 21 cc. of 25% solution of sodium methoxide in methanol were added in 1 to 2 cc. portions to the reaction mixture at such a rate as to maintain distillation of about 10 cc. per minute. The distillation temperature fluctuated between 40° and 155° C. showing that the distillate probably contained considerable quantities of 3,4-dihydro-2H-pyran - 2 - methyl-(3,4-dihydro-2H-pyran-2-carboxylate). The total distillate had a volume of 1170 cc. The liquid residue in the reaction flask weighed 1468 grams. In addition there was produced about 30 grams of a solid suspension in a viscous liquid.

EXAMPLE 7

80.7 grams of 1,2,6-hexanetriol (commercial grade, water content 0.43%), 255 grams of commercial polypropylene glycol of average molecular weight of 425 and average hydroxyl number of 265 mg. KOH/g. (water content 0.25%) and 34 grams of distilled dihydropyranyl methanol were charged into a 1-liter flask described in Example 3. Dihydropyranyl methanol was distilled off under vacuum (27.5 grams). From the water content of this distillate it is deduced that 87.3% of water in the reaction mixture had been removed. To the dried reaction mixture at 120° C. 1.1 grams of sodium was added under nitrogen and the flask was quickly evacuated; the sodium dissolved in 4 minutes raising the temperature of the reaction mixture to 140° C.

The reaction mixture was allowed to cool to 120° C. and while it was agitated under vacuum, 739 grams (3.30 moles) of redistilled 3,4-dihydro-2H-pyran-2-methyl-(3,4-dihydro-2H-pyran-2-carboxylate) was added to the reaction mixture from a separatory funnel fitted with a hypodermic needle via the serum bottle cap. During the addition which took 16 minutes dihydropyranyl methanol distilled over and the reaction mixture was maintained between 90 and 120° C. When 183 grams of the distillate were collected (3 mm. pressure) the rate of distillation became very slow indicating exhaustion of the catalyst. This distillate contained 94% of dihydropyranyl methanol, 1.3% of 3,4-dihydro-2H-pyran - 2 - methyl-(3,4-dihydro-2H-pyran-2-carboxylate) and 3.8% of 3,4-dihydro-2H-pyran-2-carboxyaldehyde and was substantially free from methyl dihydropyran-2-carboxylate. The transesterification of the reaction mixture was then continued by the addition of sodium methoxide catalyst 1 cc. at a time. Altogether 4 cc. of catalyst (25% solution in methanol) were used yielding 175 grams of distillate which contained 13.5% of 3,4-dihydro - 2H - pyran-2-methyl-(3,4-dihydro-2H-pyran-2-carboxylate), 78% of dihydropyranyl methanol, 2.7% of 3,4-dihydro-2H-pyran-2-carboxaldehyde and 4.3% of methyl dihydropyran-2-carboxylate. The product was a liquid (684 grams, viscosity 3.6 poises) containing a semi-solid (29.4 grams). The cold trap contents weighed 8 grams. The material balance accounts 99.5% of the mass of all reactants.

The above experiment shows that the formation of methyl dihydropyran-2-carboxylate which is an undesirable contaminant of the by-product dihydropyranyl methanol can be avoided completely by employing solutions of transesterification catalyst in polyols.

EXAMPLE 8

89 grams of 1,2,6-hexanetriol, 212 grams of polypropylene glycol of average molecular weight of 425 and average hydroxyl number of 265 mg. KOH/g. and 30 grams of dihydropyranyl methanol were dried by the procedure of Example 7. 1.50 grams of sodium was dissolved in the reaction mixture, followed by addition of 739 grams of 3,4-dihydro-2H-pyran-2-methyl-(3,4-dihydro-2H-pyran-2-carboxylate) which was preheated to 105° C. and added in 13 minutes to the reaction mixture between 120 and 128° C. 145 cc. of distillate was collected at this stage, B.P. 70–78° C./8–9 mm. Pressure was reduced to 3 mm. but the rate of distillation gradually decreased and the reaction was completed by adding 5 cc. of 25% sodium methoxide solution 1 cc. at a time. The material balance accounted for 99.5% of mass introduced with the reactants. The distillates contained 2.5 moles of dihydropyranyl methanol, 0.20 mole of 3,4-dihydro-2H-pyran - 2 - methyl-(3,4-dihydro-2H-pyran-2-carboxylate), 0.08 mole of methyl dihydropyran-2-carboxylate, 0.05 mole of 3,4-dihydro-2H-pyran-2-carboxaldehyde. The product (liquid, visc. 4.9 poises, 600 g. and semi-solid 38 g.) contained 0.23 mole 3,4-dihydro-2H-pyran-2-methyl-(3,4-dihydro-2H-pyran-2-carboxylate).

EXAMPLE 9

212.5 grams of polypropylene glycol of average molecular weight of 425 and average hydroxyl number of 265 mg. KOH/g., 146 grams of glycerol (water content 4.3%) and 616 grams of redistilled 3,4-dihydro-2H-pyran-2-methyl-(3,4-dihydro - 2H - pyran-2-carboxylate) were placed in the apparatus of Example 3 and heated under vacuum to 120° C. 1.5 grams of material collected in the trap during this period which was 90% water. Sodium methoxide catalyst was then added in the usual manner while dihydropyranyl methanol was distilled off. Towards the end of the reaction the flask temperature was increased to 170° C. The pressure during the reaction was gradually reduced from 11 to 6 mm. Hg. The total distillate was 312 grams and contained 2.8% of 3,4-dihydro-2H-pyran-2-carboxaldehyde, 7.7% of methyl dihydropyran-2-carboxylate, 81.7% of dihydropyranyl methanol and 6.4% of 3,4-dihydro-2H-pyran-2-methyl-(3,4-dihydro-2H-pyran-2-carboxylate). The residue (viscosity 3.5 poises, 551 g.) contained 16.6% of unreacted 3,4-dihydro-2H-pyran-2-methyl-(3,4-dihydro-2H-pyran-2-carboxylate).

EXAMPLE 10

134 grams of 1,2,6-hexanetriol and 739 grams of redistilled 3,4-dihydro-2H-pyran-2-methyl-(3,4-dihydro-2H-pyran-2-carboxylate) were placed in the apparatus of Example 3 and were transesterified by the procedure of Example 9 yielding 380 grams of distillate, 853 grams of liquid products and 26 grams of semi-solid residue. 10 cc. of sodium methoxide was consumed in the preparation which took 45 minutes. The combined distillates contained 2.43 moles of dihydropyranyl methanol, 0.09 mole of methyl dihydropyran-2-carboxylate, 0.08 mole of 3,4-dihydro-2H-pyran-2-carboxaldehyde and 0.17 mole of 3,4-dihydro-2H-pyran-2-methyl-(3,4-dihydro-2H-pyran-2-carboxylate). The liquid product had a viscosity of 14 poises.

EXAMPLE 11

456 grams of dimethylphthalate (4.7 equivalents) and 388 grams of dihydropyranyl methanol (96.2%) were placed in the apparatus of Example 3 and transesterified with 4 cc. of sodium methoxide catalyst at 110° C. and 93 mm. mercury while dihydropyranyl methanol slowly distilled into the receiver. In 19 minutes about 110 cc. of methanol was collected in the trap. The reaction was interrupted, the dihydropyranyl methanol which distilled over was returned to the reaction mixture, and 65 grams of 1,2,6-hexanetriol (1.46 equivalents of hydroxyl groups) was also added to the reaction mixture. Transesterification was resumed, while pressure was gradually reduced from 100 to 4 mm. mercury. During this period 42.5 grams of material which was 89% dihydropyranyl methanol distilled over into the receiver. The product, a liquid of viscosity of 122 poises, weighed 712 grams. Conversion based on methanol produced in the reaction was 91.5% and on the dihydropyranyl methanol consumed in the reaction was 90%. A blend composed of 53% of the product and 47% of the product of Example 8 had viscosity of 19.2 poises.

EXAMPLE 12

370 grams (1.91 moles) of dimethylphthalate, 298 grams of dihydropyranyl methanol [(96%) 2.51 moles] and 240 grams of polypropylene glycol of average molecular weight of 425 and average hydroxyl number of 265 mg. KOH/g. (0.56 mole) were reacted using the procedure of Example 3, yielding 959 grams of a product which had a viscosity of 46.5 poises. Conversion based on the methanol produced was 86%. 11 cc. of sodium methoxide catalyst were employed in the reaction which took 70 minutes to complete.

EXAMPLE 13

Dimethylphthalate (985 grams, 5 moles), dihydropyranyl methanol (96.2%, 595 grams, 5 moles) and redistilled 1,2,6-hexanetriol (2 moles, 268 grams) were placed into a 2-liter flask equipped with a temperature regulator, a mechanical agitator, a side neck sealed with a serum bottle cap and a reflux condneser whose outlet was connected through a series of traps cooled in a mixture of Dry Ice and methanol to a vacuum line. The mixture was transesterified in a conventional manner with sodium methoxide catalyst (9 cc.) for 54 minutes while dihydropyranyl methanol was refluxing vigorously. About 320 cc. of methanol collected in the cold traps during this period. The reflux condenser was then replaced by a distillation assembly, the reaction mixture was distilled under vacuum yielding 179 grams of distillate while further 3 cc. of catalyst solution were added. Total trap contents weighed 302.1 grams (s.g. 0.80) and the product weighed 1311 grams. It was a black liquid which became very viscous on cooling. It was judged to be too viscous for foaming but its blends with the products of Examples 7, 8, 9 and 10 although still viscous could be used in foams.

EXAMPLE 14

1345 grams of redistilled 3,4-dihydro-2H-pyran-2-methyl-(3,4-dihydro-2H-pyran-2-carboxylate) (6 moles), 500 grams of LHT–112 (an oxypropylated polyol of average molecular weight of 1500 and average hydroxyl numbers of 112 mg. of KOH/g.) and 99.5 grams of redistilled gylcerol were charged into a two liter flask adapted for transesterification. A catalyst solution prepared by dissolving 7.74 grams of sodium in 331 grams of 1,2,6-hexanetriol was continuously added to the reaction mixture maintained at 120° C. from a burette fitted with a hypodermic needle. Distillation of dihydropyranyl methanol started at 3 mm. pressure when about 32 cc. of the catalyst solution were added. A total of 62 cc. (68.6 grams) of catalyst were used and following the completion of the transesterification the reaction mixture was stripped of low boiling components until the base temperature reached 150° C. Altogether 721 grams of distillate were collected. The product was a dark liquid (1211 grams) containing 76 grams of semi-solids.

700 grams of the distillate prepared in the above transesterification experiment, 970 grams of dimethyl phthalate, 49 grams of dihydropyranyl methanol and 91.3 grams of glycerol were placed in a flask equipped for transesterification and provided with means for continuous return of distillate from the receiver. Transesterification was carried out with the sodium solution in 1,2,6-hexanetriol catalyst added continuously, while dihydropyranyl methanol was recycled from the receiver to the reaction flask at 110° C. and pressure which was gradually reduced from 68 to 15 mm. mercury. Following the transesterification the base temperature was increased to 150° C. and the pressure was reduced to 4 mm. to remove the residual low boiling components (249 grams, s.g. 1.06); the trap contents (s.g. 0.793) was 231.4 grams. The product was a rather viscous liquid (1717 grams) which had to be warmed to pour. It was blended with the product of the transesterification of 3,4-dihydro-2H-pyran-2-methyl-(3,4-dihydro-2H-pyran-2-carboxylate) from the first part of the example. The blend had a viscosity of 70.5 poises.

A series of foamed cellular polymeric materials were prepared from foamable compositions including as ingredients ester products as prepared in the above described examples. The compositions are described in Table II. In three of the foamable compositions the trimeric aldol condensation product of 3,4-dihydro-2H-pyran-2-carboxaldehyde, prepared as described in copending British patent application 26,606/64 filed on June 26, 1964, was employed as an additional reactive ingredient. The foams were prepared by mixing the ingredients and pouring into a mould. The resulting foams were tested by maintaining a ¾ inch square cube of the foam in boiling water for 7 days or for a lesser period if breakdown occurred sooner. The loss of weight and volume shrinkage of the cube of foamed cellular material were measured at the termination of the boiling water test. The appearance of the material, especially the development of cavities, was also observed. The results are shown in Table II. It can be seen that foams made from compositions including both a dihydropyranyl carboxylic acid ester of an aliphatic polyol and a dihydropyranyl alcohol ester of an aromatic polycarboxylic acid have superior hydrolytic stability when compared with foams made from compositions having only the dihydropyranyl carboxylic acid ester of an aliphatic polyol.

TABLE II

| Main Ingredients | Ingredients | | | | | Characteristics of Foams | | | | |
|---|---|---|---|---|---|---|---|---|---|---|
| | Weight of main Ingredients, grams | Trichloro-monofluoro-methane, cc. | Siloxane oxyalkylene copolymer type surfactant, cc. | Borontri-fluoride etherate/polypropylene glycol of MW 425 1:2, cc. | Appearance of foam as prepared | Duration of boiling water test | Percent Loss in weight during boiling water test | Percent Volume shrinkage during boiling water test | Appearance of foam after boiling water test |
| Ester, Example 1 | 18.5 | | 0.2 | 3 | Hard foam, medium cells with good skin, friable, no splits | 7 days | 37.8 | 33.5 | Foam cube not deformed, no cavities formed, no apparent change in texture. |
| Ester, Example 3 | 21.5 | 5 | | | | | | | |
| Ester, Example 5 | 8.0 | | | | | | | | |
| Ester, Example 1 | 5.8 | 5 | 0.2 | 3 | Slightly friable foam with fine cells, dark, hard bad splits | do | 33.3 | 51 | Cavities formed, foam slightly deformed. |
| Ester, Example 3 | 15.8 | | | | | | | | |
| 3,4-dihydro-2H-pyran-2-methyl-(3,4-dihydro-2H-pyran-2-carboxylate) | 12.4 | | | | | | | | |
| Ester, Example 6 | 12.7 | | 0.2 | 2 | Hard foam with fine cells, some splits, good skin | 4 days | 35.0 | 74 | Do. |
| Ester, Example 1 | 7.2 | 5 | | | | | | | |
| Ester, Example 3 | 20.7 | | | | | | | | |
| Ester, Example 3 | 40 | 5 | 0.2 | 4.0 | Scorched foam, weak, friable, medium size cells good skin | 17 hrs | 48.2 | | Interior completely eroded. |
| Ester, Example 1 | 35 | 5 | 0.2 | 4.0 | Scorched foam, fine cells, weak, friable | do | 31.2 | | Do. |
| Ester, Example 5 | 5 | | | | | | | | |
| Ester, Example 3 | 20 | 5 | 0.2 | 2.5 | Good skin, medium size cells, scorched hard, not friable | 7 days | 36.6 | | Foam cube not deformed, no cavities formed, no apparent change in texture. |
| Ester, Example 7 | 20 | | | | | | | | |
| Ester, Example 7 | 20 | 5 | 0.2 | 2.5 | Good skin, medium size cells somewhat scorched slightly friable | do | 43.1 | | Do. |
| Ester, Example 9 | 20 | | | | | | | | |
| Ester, Example 7 | 40 | 5 | 0.2 | 2.5 | Good skin, fine cellular structure, splits, nonfriable | 18 hrs | 16.7 | | Interior completely eroded. |

| Main Ingredients | Ingredients | | | | | Characteristics of Foams | | | | | |
|---|---|---|---|---|---|---|---|---|---|---|---|
| | Weight of main ingredients, grams | Trichloro-monofluoro-methane, cc. | Siloxane oxyalkylene copolymer type surfactant, cc. | Borontri-fluoride etherate/polypropylene glycol of MW 425 1:2, cc. | Appearance of foam as prepared | Duration of boiling water test | Percent loss in weight during boiling water test | Appearance of Foam after boiling water test | Density, lbs./cu. ft. | | |
| Ester, Example 9 | 40 | 5 | 0.2 | 2.5 | Resilient but weak foam with fine cells and good but sticky skin | 18 hrs | 25.8 | Interior completely eroded | | | |
| Ester, Example 11 | 23.2 | 5 | 0.2 | 1.5 | Sticky skin, friable foam with big cells and splits | 7 days | 25.6 | Cube somewhat deformed small cavities | 2.8 | | |
| Ester, Example 10 | 16.8 | | | | | | | | | | |
| Ester, Example 11 | 20.9 | 5 | 0.2 | 2.0 | Slightly tacky, scorched foam, fine cellular structure | do | 40.8 | Cube badly deformed but no cavities | 2.8 | | |
| Ester, Example 8 | 19.1 | | | | | | | | | | |
| Ester, Example 10 | 40 | 5 | 0.2 | 2.0 | Hard foam with fine cellular structure and splits | 18 hrs | 19.0 | Interior completely eroded | 3.7 | | |
| Ester, Example 11 | 40 | 5 | 0.2 | 1.0 | Hard, friable foam with fine cellular structure | do | 8.8 | Interior partly eroded | 3.2 | | |
| Ester, Example 10 | 27.0 | 5 | 0.2 | 2.0 | Hard and slightly friable foam | 7 days | 30.0 | Cube badly deformed but no cavities | 3.1 | | |
| Ester, Example 11 | 25.4 | | | | | | | | | | |
| Ester, Example 11 | 14.6 | 5 | 0.2 | | Slightly friable foam | do | 26.4 | Cube very badly deformed | 3.2 | | |
| Ester, Example 11 | 23.3 | | | | | | | | | | |
| Ester, Example 11 | 16.7 | 5 | 0.2 | | Slightly friable soft foam | do | 34.9 | do | 3.2 | | |
| Ester, Example 11 | 15.0 | | | | | | | | | | |
| Ester, Example 8 | 17.0 | 6 | 0.2 | 1.5 | Slightly friable foam with fine cellular structure, good skin | do | 27.6 | Badly deformed but no cavities | 1.86 | | |
| Aldol trimer | 8 | | | | | | | | | | |
| Ester, Example 11 | 12.5 | 6.7 | 0.2 | 1.25 | Friable foam with medium sized cells; brittle skin | do | 5.6 | Almost unchanged | 1.37 | | |
| Ester, Example 8 | 13.5 | | | | | | | | | | |
| Aldol trimer | 12.5 | | | | | | | | | | |
| Ester, Example 11 | 9.5 | 7.7 | 0.2 | 1.25 | Friable foam with medium sized cells, brittle and sticky skin | do | 1.7 | do | 1.14 | | |
| Ester, Example 12 | 10.5 | | | | | | | | | | |
| Aldol trimer | 19.5 | | | | | | | | | | |

NOTE.—Foams are called deformed if, following drying at the end of the test the cubes are distorted. Often the test samples retain the cubic shape throughout the boiling period but become distorted on cooling. Aldol trimer is the trimeric aldol condensation product of 3,4-dihydro-2H-pyran-2-carboxaldehyde.

What I claim is:

1. A cellular polymeric material which is the reaction product of a foamable composition comprising a blend of esters of the formulas

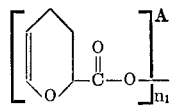

and

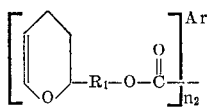

where $n_1$ and $n_2$ are integers at least one of which has a value of at least 2, $R_1$ is a divalent lower aliphatic radical, A is a linking aliphatic radical having a valence equal to $n_1$, and Ar is a linking aromatic radical having a valence equal to $n_2$, a foaming agent and a catalyst.

2. A cellular polymeric material as claimed in claim 1 where A in the formula is an aliphatic radical selected from the group consisting of glyceryl, the hydroxyl group-deficient residue of hexanetriol, and the hydroxyl group-deficient residues of propylene glycols.

3. A cellular polymeric material as claimed in claim 1 wherein Ar in the formula is a phenylene radical.

4. A cellular polymeric material as claimed in claim 1 wherein the ester blend component of the composition comprises esters of the formulas

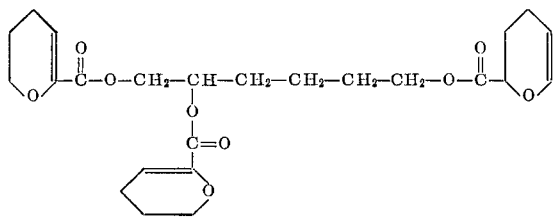

and

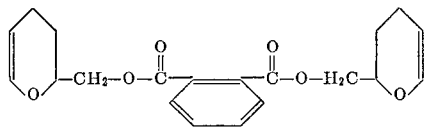

5. A cellular polymeric material as claimed in claim 4 wherein the ester blend component of the composition includes an ester of the formula

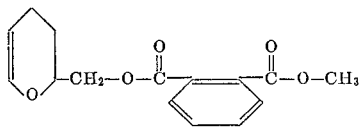

6. A cellular polymeric material as claimed in claim 4 wherein the ester blend component of the composition includes an ester of the formula

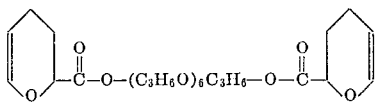

7. A cellular polymeric material as claimed in claim 1 wherein the ester blend component of the composition includes an ester of the formula

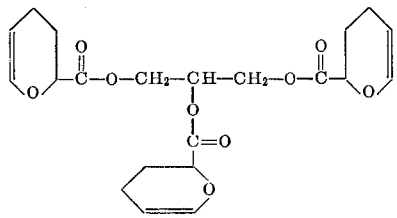

8. A cellular polymeric material as claimed in claim 1 wherein the ester blend component of the composition comprises esters of the formulas

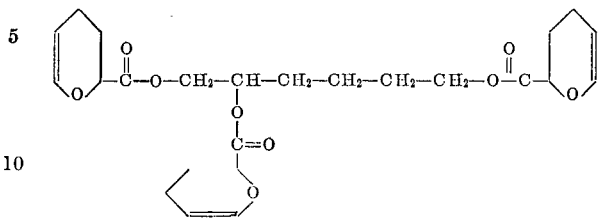

and

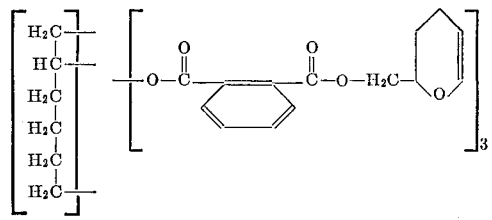

9. A cellular polymeric material as claimed in claim 8 wherein the ester blend component of the composition includes an ester of the formula

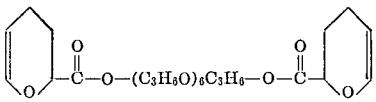

10. A cellular polymeric material as claimed in claim 1 wherein the catalyst of the composition is borontrifluoride etherate.

11. A cellular polymeric material as claimed in claim 1 wherein the foamable composition includes at least one member selected from the group consisting of compounds of the formulas

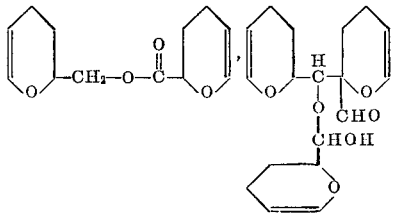

and

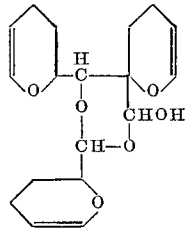

12. A process for preparing a cellular polymeric material which comprises:
(1) reacting a dihydropyranyl group-terminated ester wherein the terminal dihydropyranyl groups are linked by a single ester linkage, an aliphatic polyhydric alcohol, and a lower alkyl ester of an aromatic polycarboxylic acid in the presence of an ester exchange catalyst, the proportions of the reactants being such as to form a dihydropyranyl monocarboxylic acid ester of the aliphatic polyhydric alcohol, a dihydropyranyl monohydric alcohol ester of the aromatic polycarboxylic acid, and a lower alkyl monohydric alcohol,
(2) separating the lower alkyl monohydric alcohol from the reaction mixture, and
(3) mixing the dihydropyranyl monocarboxylic acid ester of the aliphatic polyhydric alcohol and the dihydropyranyl monohydric alcohol ester of the aromatic polycarboxylic acid with a foaming agent and a catalyst, and allowing the mixture to foam.

13. A process for preparing a cellular polymeric material as claimed in claim 12 wherein the ester ingredients are prepared by the steps comprising:
   (1) reacting a dihydropyranyl group-terminated ester wherein the terminal dihydropyranyl groups are linked by a single ester linkage with an aliphatic polyhydric alcohol in the presence of an ester exchange catalyst, the proportions of the reactants being such as to form a dihydropyranyl monohydric alcohol and a dihydropyranyl monocarboxylic acid ester of the aliphatic polyhydric alcohol,
   (2) separating the dihydropyranyl monohydric alcohol from the dihydropyranyl monocarboxylic acid ester of the aliphatic polyhydric alcohol,
   (3) reacting the dihydropyranyl monohydric alcohol with a lower alkyl ester of an aromatic polycarboxylic acid in the presence of an ester exchange catalyst, the proportions of the reactants being such as to form an alkyl monohydric alcohol and the dihydropyranyl monohydric alcohol ester of the aromatic polycarboxylic acid, and
   (4) separating the alkyl monohydric alcohol from the dihydropyranyl monohydric alcohol ester of the aromatic polycarboxylic acid.

14. A process for preparing a cellular polymeric material as claimed in claim 12 wherein the ester ingredients are prepared by the steps comprising:
   (1) reacting 3,4-dihydro-2H-pyran-2-methyl-(3,4-dihydro-2H-pyran-2-carboxylate) with 1,2,6-hexanetriol in the presence of an ester exchange catalyst, the proportions of the reactants being such as to form dihydropyranyl-2-methanol and the tridihydropyranyl-2-carboxylic acid ester of 1,2,6-hexanetriol,
   (2) separating the dihydropyranyl-2-methanol from the tridihydropyranyl-2-carboxylic acid ester of 1,2,6-hexanetriol,
   (3) reacting the dihydropyranyl-2-methanol with dimethyl phthalate in the presence of an ester exchange catalyst, the proportions of the reactants being such as to form methanol and the bis-dihydropyranyl-2-methanol ester of phthalic acid, and
   (4) separating the methanol from the bis-dihydropyranyl ester of phthalic acid.

15. A process for preparing a cellular polymeric material as claimed in claim 14 wherein during step (1) 3,4-dihydro - 2H - pyran - 2 - methyl - (3,4 - dihydro - 2H-pyran-2-carboxylate) is reacted with a mixture of 1,2,6-hexanetriol and polypropylene glycol of molecular weight 425.

16. A process for preparing a cellular polymeric material as claimed in claim 12 wherein the ester ingredients are prepared by the steps comprising:
   (1) reacting a dihydropyranyl group-terminated ester wherein the terminal dihydropyranyl groups are linked by a single ester linkage with a lower alkyl ester of an aromatic polycarboxylic acid in the presence of an ester exchange catalyst, the proportions of the reactants being such as to form a lower alkyl ester of the dihydropyranyl monocarboxylic acid and a dihydropyranyl monohydric alcohol ester of the aromatic polycarboxylic acid,
   (2) separating the lower alkyl ester of the dihydropyranyl monocarboxylic acid from the dihydropyranyl monohydric alcohol ester of the aromatic polycarboxylic acid,
   (3) reacting the lower alkyl ester to the dihydropyranyl monocarboxylic acid with an aliphatic polyhydric alcohol in the presence of an ester exchange catalyst, the proportions of the reactants being such as to form an alkyl monohydric alcohol and a dihydropyranyl monocarboxylic acid ester of the aliphatic polyhydric alcohol, and
   (4) separating the alkyl monohydric alcohol from the dihydropyranyl monocarboxylic acid ester to the aliphatic polyhydric alcohol.

17. A process for preparing a cellular polymeric material as claimed in claim 12 wherein the ester exchange catalyst is selected from the group consisting of sodium methoxide and magnesium dihydropyranyl methoxide.

18. A process for preparing a cellular polymeric material as claimed in claim 12 wherein the ester exchange catalyst is an alkali metal alkoxide of an aliphatic polyhydric alcohol.

19. A process for preparing a cellular polymeric material as claimed in claim 12 wherein the ester exchange catalyst is the sodium alkoxide of 1,2,6-hexanetriol.

20. A process for preparing a cellular polymeric material as claimed in claim 12 wherein the ester exchange reactions are carried out at a temperature in the range of 90° C. to 180° C.

References Cited

UNITED STATES PATENTS

| | | | |
|---|---|---|---|
| 3,311,573 | 3/1967 | Graham et al. | 260—2.5 |
| 3,311,574 | 3/1967 | Bowering et al. | 260—2.5 |
| 3,311,575 | 3/1967 | Graham | 260—2.5 |

MURRAY TILLMAN, *Primary Examiner.*

M. FOELAK, *Assistant Examiner.*